United States Patent [19]

DePasquale

[11] Patent Number: 5,119,719
[45] Date of Patent: Jun. 9, 1992

[54] AUTOMATED PIZZA OVEN

[76] Inventor: George B. DePasquale, 1820 Albany Ave., West Hartford, Conn. 06117

[21] Appl. No.: 785,286

[22] Filed: Oct. 30, 1991

[51] Int. Cl.$^5$ .......................... A21B 1/44; A47J 37/06
[52] U.S. Cl. ........................... 99/334; 99/423; 99/427; 99/443 C; 126/21 A; 126/41 A; 219/388; 432/142
[58] Field of Search ............... 99/339, 386, 389, 391, 99/393, 443 R, 443 C, 342, 343, 423, 334; 432/138, 142; 126/21 A, 41 A; 219/388; 426/233, 496, 497

[56] References Cited

U.S. PATENT DOCUMENTS

| 2,372,362 | 3/1945 | Dawson | 99/447 |
|---|---|---|---|
| 2,438,699 | 3/1948 | Groetchen | 99/423 |
| 3,604,338 | 9/1971 | Fiedler | 99/446 |
| 4,305,329 | 12/1981 | Fenoglio | 99/339 |
| 4,411,920 | 10/1983 | Fenoglio | 426/233 |
| 4,506,652 | 3/1985 | Baker et al. | 126/21 A |
| 4,912,338 | 3/1990 | Bingham | 219/388 |
| 4,919,477 | 4/1990 | Bingham et al. | 99/427 |
| 4,924,763 | 5/1990 | Bingham | 432/142 |
| 4,924,767 | 5/1990 | Stuck | 99/443 C |
| 4,960,977 | 10/1990 | Alden | 219/388 |

Primary Examiner—Timothy F. Simone
Attorney, Agent, or Firm—McCormick, Paulding & Huber

[57] ABSTRACT

An automated pizza oven comprising a massive oven enclosure with a fire brick liner about a baking chamber and a massive fire brick turntable disposed in the baking chamber an forming the bottom surface thereof. A variable speed drive motor is connected with and slowly rotates the turntable. A pair of doors are provided for the baking chamber and a fire chamber employes coal or other natural fuel in open communicaation with the baking chamber. A pair of temperature sensors and a drive motor speed sensor respond respectively to baking chamber temperature and turntable speed and are fed to a control means for the regulation of turntable speed as a function of baking chamber temperature.

13 Claims, 3 Drawing Sheets

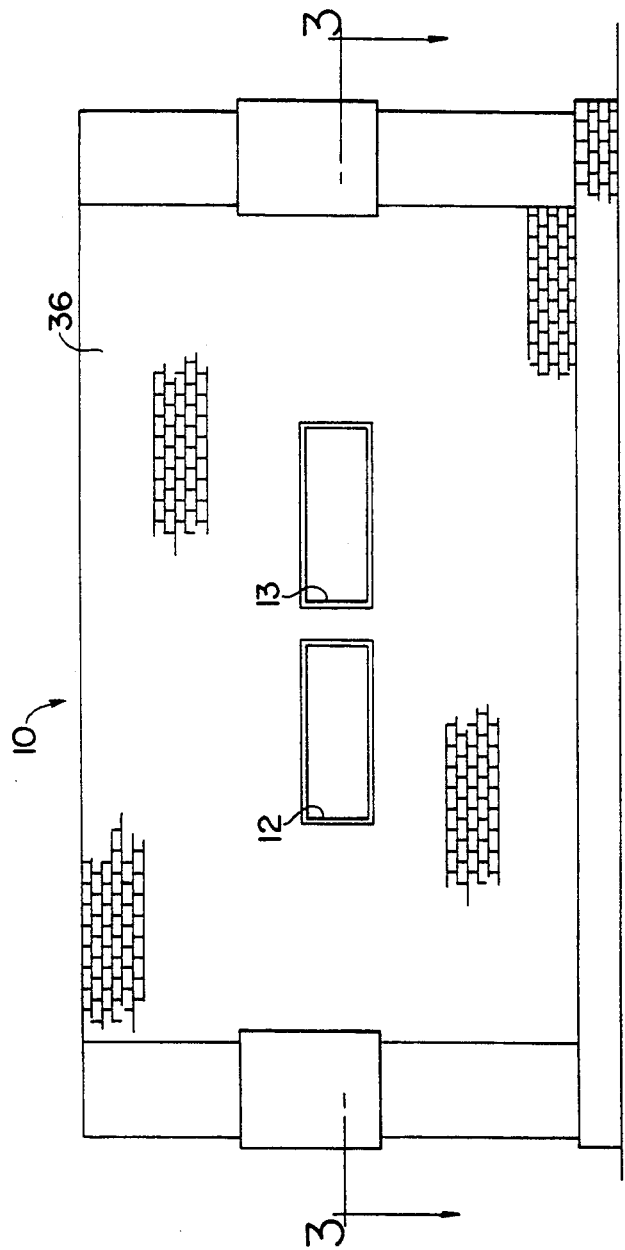
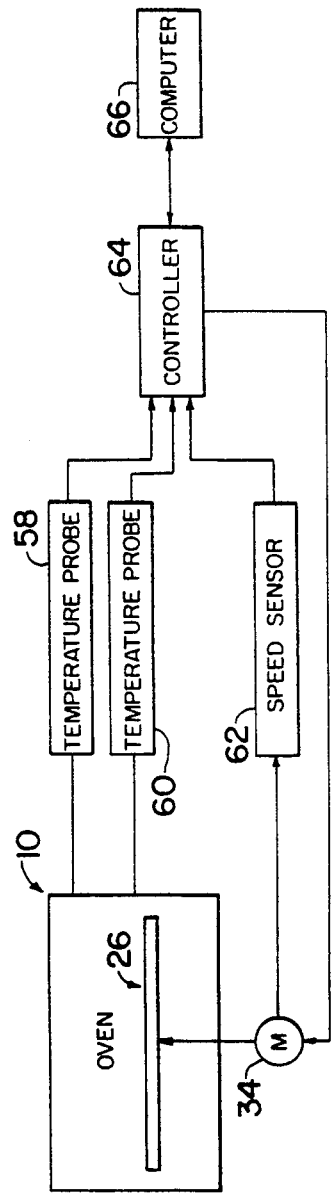

5,119,719

AUTOMATED PIZZA OVEN

BACKGROUND OF THE INVENTION

The present invention relates to ovens adapted for the preparation of food and, more particularly, to ovens for baking pizza and the like.

Pizza aficionados have long preferred "brick oven pizza". That is, pizza baked in a traditional style brick oven employing a natural fuel such as coal is deemed by many to have a much superior flavor. There are, however, significant disadvantages in the preparation of pizza in a brick oven. The construction of a traditional style brick oven is quite expensive when compared with contemporary small pizza ovens of metallic construction. Further, traditional brick ovens for baking pizza and the like have not been successfully automated to date.

It is the general purpose of the present invention to provide for the automation of a traditional brick pizza oven and thus to achieve superior baking of the pizza as well as enhanced consistency and uniformity in the preparation of large numbers of pizzas.

SUMMARY OF THE INVENTION

In fulfillment of the foregoing object, a massive oven enclosure is provided and defines a baking chamber which has at least a liner portion thereof around the baking chamber constructed of a refractory material. More specifically, the liner for the baking chamber is constructed of fire brick with the exterior of the oven preferably constructed of conventional construction brick.

A massive turntable also constructed of a refractory material, preferably fire brick, is disposed wholly within the oven and defines at least a major portion of the bottom surface of the baking chamber. A variable speed drive means, preferably in the form of a variable speed electric motor, is connected with and is operable to slowly rotate the turntable.

At least one door means is provided and preferably takes the form of a pair of horizontally adjacent doors through the oven enclosure and in communication with the baking chamber. Thus, pizzas may be introduced and removed from the turntable surface for baking of the same seriatim during slow progressive movement around the baking chamber on the periphery of the turntable.

A fire chamber in communication with the baking chamber is adapted to accommodate a slow burning natural fuel such as coal, wood, oil, or gas which is relatively incapable of rapid temperature regulation and rapid start and stop operation. At least one and preferably two exhaust flues are provided in communication with the baking chamber. The fire chamber also has a charging door for the introduction of coal or the like.

The oven has at least one and preferably two associated temperature probes or sensors responsive to baking chamber temperature and a control means is provide for operation in response to the temperature sensors and is also operatively connected with the variable drive means for the turntable. The control means is thus operable to regulate drive means and turntable speed in response to temperature conditions in the baking chamber. Accordingly, provision can be made for a combination of exposure time and temperature condition which results in superior baking of the pizzas and the like during a predetermined number of revolutions of the turntable. A single revolution of the turntable is employed in most instances but multiple revolutions may of course be readily provided for.

As will be apparent, baking time and temperature may vary and a range of three (3) to six (6) minutes is preferably provided for with a measured baking chamber temperature falling between 350° and 450° Fahrenheit. For example, a baking time of four (4) minutes at a temperature of 400° Fahrenheit results in an excellent pizza. It will also be apparent that temperature may vary widely in the oven and may be as high as seven to eight (700–800) hundred degrees Fahrenheit adjacent the fire chamber.

It should also be noted that the automation of the baking process results in greatly enhanced consistency and uniformity of product even though the over operator or attendant may not be a highly skilled baker. The control means for the oven can be programmed to provide for precise combinations of baking time and temperature so as to result in closely controlled repetitive operation of the oven and in consistent and uniform pizza quality. Provision can of course also be made for setting the speed of rotation of the turntable manually.

BRIEF DESCRIPTION OF THE DRAWINGS

FIG. 1 is a front view of the automated pizza oven of the present invention.

FIG. 2 is a schematic representation of the oven and an associated control means.

DETAILED DESCRIPTION OF PREFERRED EMBODIMENT

Referring particularly to FIG. 1, an automated brick oven constructed in accordance with the present invention is indicated generally at 10. The oven 10 is shown in front elevation and the exterior portion thereof may be constructed of conventional construction brick. Door means in communication with a baking chamber within the oven preferably comprise first and second or left and right hand horizontally adjacent doors 12 and 14. The doors 12 and 14 provide for the introduction of pizzas to the baking chamber within the oven and for the subsequent removal of pizzas therefrom. Depending on the direction of rotation of a turntable within the oven, the doors 12, 14 may selectively be designated for the introduction and removal of pizzas to and from the oven and turntable. An operator or attendant may stand in front of the oven and open and close the doors 12, 14 at timed intervals as required for the introduction of unbaked pizzas and for the removal of baked pizzas from the oven.

Figure 3:
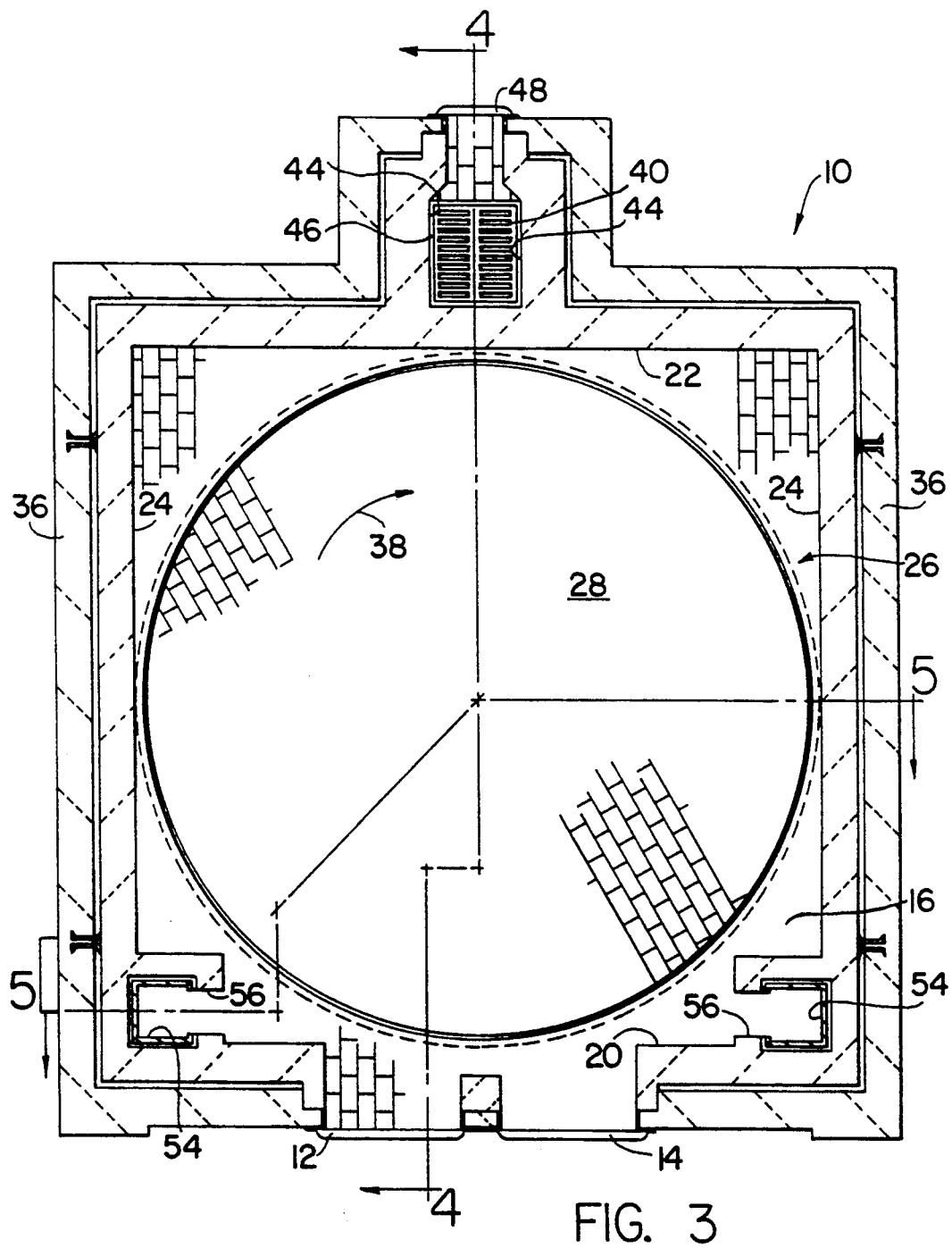
FIG. 3 is a horizontal section taken generally as indicated at 3—3 in FIG. 1.
Figure 4:
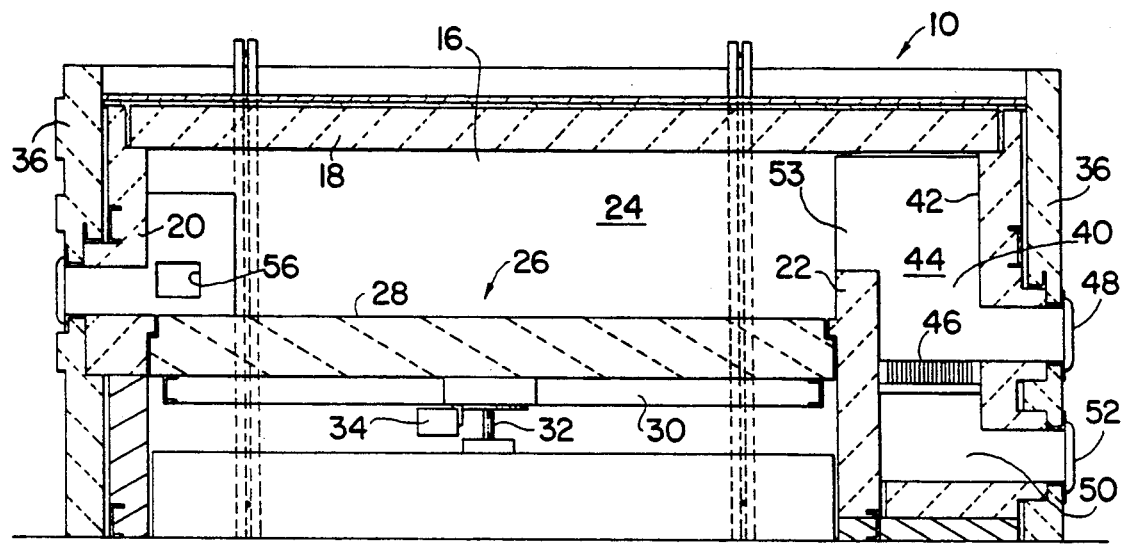
FIG. 4 is a vertical section of the automated oven taken generally as indicated at 4—4 in FIG. 3.

Referring now to FIGS. 3 and 4, it will be observed that a baking chamber 16 is defined by and within the oven 10 and has a liner of refractory material. The liner preferably takes the form of fire brick, and comprises a horizontal top panel 18, vertical front and rear panels 20, 22 and vertical side panels 24, 24, one shown in FIG. 4. A turntable indicated generally at 26 is constructed of a refractory material, preferably fire brick, and has an upper surface 28 which defines the bottom of the baking chamber 16. The turntable is disposed wholly within the oven as shown and is supported for rotation by suitable metal structural members therebeneath at 30. The metal structural numbers 30 are mounted on a shaft 32 which has an associated drive means, preferably, a small variable speed electric motor 34. The motor 34 rotates the turntable at a very slow speed under the regulation of a control means to be described hereinbelow.

Figure 5:
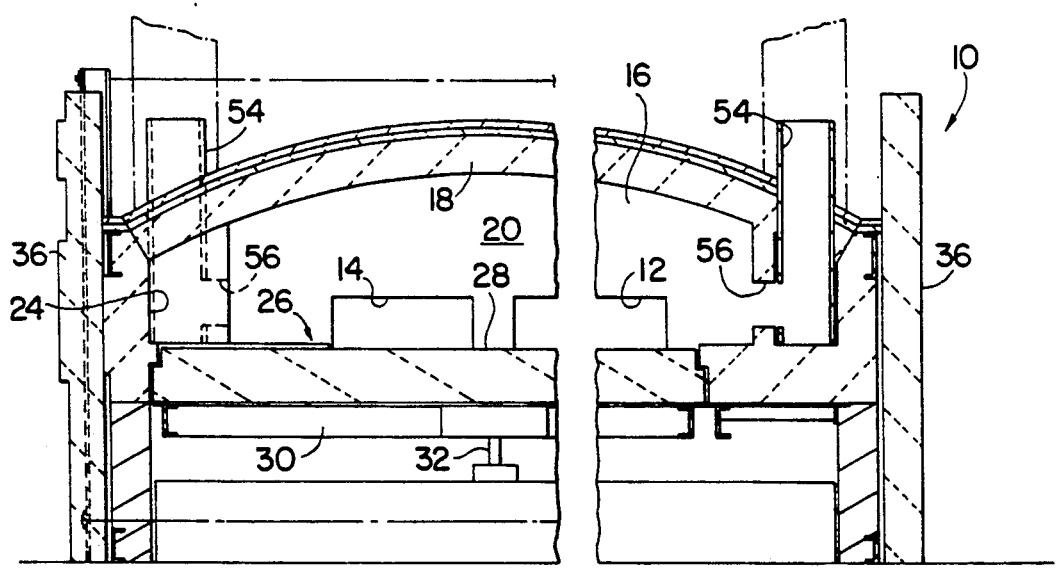
FIG. 5 is a second vertical section taken generally as indicated at 5—5 in FIG. 3.

As best illustrated in FIGS. 3, 4, and 5, conventional construction brick may be used for the walls 36, 36 externally of the fire brick panels 18, 20 et sequa.

The turntable 26 may, for example, be rotated by the motor 34 in a clockwise direction as indicated by arrow 38 with the left hand door 12 serving for the introduction of pizzas to the baking chamber and for placement of the same on the periphery of the turntable adjacent the door for slow progressive movement around the baking chamber thereon. Approximately fifty (50) ten inch diameter pizzas can be accommodated by the turntable 26 shown. When pizzas reach a position adjacent the door 14 they may be removed therethrough on completion of one or more revolutions of the turntable 26 as may be required for baking under the temperature conditions prevailing and the regulated speed of rotation of the turntable 26. Preferably, the rotational speed of the turntable 26 is regulated by means of a computer program, more fully described hereinbelow, so as to provide for complete and superior baking of the pizzas in a single revolution of the turntable 26.

Referring particular to FIGS. 3 and 4, a fire chamber is also illustrated at 40 in communication with the baking chamber 16. The fire chamber 40 is adapted for the accommodation of a slow burning natural fuel such as coal which is relatively incapable of rapid temperature regulation and rapid start and stop operation. The superior baking of the pizzas achieved in traditional brick ovens is believed to derive at least in part from the coal or other natural fuel as mentioned above as an oven heating medium. The fire chamber 40 is defined by refractory material, preferably fire brick, having a rear wall 42 and side walls 44, 44, FIG. 3. A grate is provided at 46 and a charging door at 48. Beneath the grate 46 an ash pit 50 has an associated door 52 for the removal of ash.

As will be apparent, a coal fire on the grate 46 is in free communication with the baking chamber 16 through an opening 53 and it is thus desirable that at least one flue be provided in communication with the baking chamber for the exhaustion of gases and other products of combustion. Two such flues are illustrated at 54, 54. The flues 54, 54 communicate through small lateral passageways 56, 56 with the baking chamber 16.

Reverting now to FIG. 2, the oven is illustrated schematically at 10, the turntable at 26, and the variable drive means or electric motor at 34. In accordance with the present invention, at least one temperature sensor or temperature probe is disposed so as to respond to the baking chamber temperature and, as shown, a pair of temperature probes are provided at 58, 60. Each of the sensors or probes, 58, 60 is responsive to temperature within the baking chamber 16 with the sensors or probes preferably disposed in positions substantially remote from each other.

Preferably, a speed sensor 62 is also provided and responds to the drive motor 34 for the turntable 26.

A control means comprising a controller 64 and a computer 66 is connected with each of the temperature sensors or probes 58, 60, with the speed sensor 62, and also with the motor 34. Thus, the control means comprising the controller 64 and computer 66 is operable to regulate the speed of the drive motor 34 and the turntable 26 in response to signals received from the temperature sensors or probes 58, 60 and the speed sensor 62.

The computer 66 is programmed for the desired relationship of exposure time and temperature which results in the aforementioned superior baking of the pizzas. More particularly, the time and temperature program provides for baking time within the range of three (3) to six (6) minutes with a baking chamber temperature between 350° and 450° Fahrenheit. Still further, in accordance with the presently preferred practice, the program is designed for completion of the baking cycle for each pizza in a single revolution of the turntable. As one example, superior results in every respect have been achieved with a baking time of four (4) minutes and with an oven temperature of 400# Fahrenheit.

The control means preferably also includes a manual speed set or override which may take the form of a potentiometer in the controller 64. Such manual means may be employed, for example, in the baking of pizza as above or in the baking of bread which may take much longer. For example, a bread baking cycle in an automatic or manual mode may involve a 300° temperature for approximately one half hour.

As will be apparent from the foregoing, a highly efficient and yet relatively simple arrangement has been provided for the automation of a brick pizza oven largely traditional in style. Individual pizzas are baked with a high degree of efficiency and excellent results are obtained even absent the close attention of a skilled baker. It is necessary merely to time the opening and closing of the doors for the introduction and removal of the pizzas. Obviously, alarms and other devices can be used as well as conventional visual readout timing means. It will also be apparent that a high degree of consistency and uniformity is achieved in quality control of the product. Such consistency and uniformity can only be duplicated with a manual oven by a highly skilled pizza baker.

I claim:

1. An oven for baking pizza comprising a massive oven enclosure which defines a baking chamber and which has at least a liner portion thereof around the baking chamber constructed of a refractory material, a massive turntable constructed of a refractory material and disposed wholly within the oven so as to define at least a major portion of the bottom surface of the baking chamber, variable speed drive means connected with and operable to slowly rotate the turntable, at least one door means opening through the oven enclosure and communicating with the baking chamber for the introduction and removal of pizzas, the pizzas being disposed on the turntable surface for baking of the same seriatim in slow progressive movement around the baking chamber thereon, a fire chamber in communication with the baking chamber and adapted to accommodate a slow burning natural fuel which is relatively incapable of rapid temperature regulation and rapid start and stop operation, at least one exhaust flue in communication with the baking chamber, a charging door for the fire chamber, at least one temperature sensor responsive to baking chamber temperature, and a control means connected with and responsive to said temperature sensor and also operatively connected with said variable drive means for said turntable, said control means being operable to regulate drive means and turntable speed in response to temperature conditions in the baking chamber whereby to provide for a combination of exposure time and temperature condition which results in superior baking of the pizzas during a pre-determined number of revolutions of the turntable.

2. An oven for baking pizza as set forth in claim 1 wherein said fire chamber is lined with refractory material and adapted to accommodate coal as fuel.

3. An oven for baking pizza and as set forth in claim 1 wherein both said baking chamber and fire chamber are lined with fire brick.

4. An oven for baking pizza as set forth in claim 3 wherein at least an upper surface of said turntable is constructed of firebrick.

5. An oven for baking pizza as set forth in claim 4 wherein the exterior portion of the oven surrounding the firebrick is formed of conventional construction brick.

6. An oven for baking pizza as set forth in claim 1 wherein said door means takes the form of a pair of horizontally adjacent doors respectively for the introduction and removal of pizzas to and from the turntable in the baking chamber.

7. An oven for baking pizza as set forth in claim 1 wherein said variable drive means takes the form of a variable speed electric motor.

8. An oven for baking pizza as set forth in claim 1 wherein a second temperature sensor is provided for response to baking chamber temperature at a location remote from said first sensor, and wherein said second sensor is connected with said control means for operation of the latter in response thereto in regulating the speed of the drive means and turntable.

9. An oven for baking pizza as set forth in claim 1 wherein a speed sensor is provided in operative association with said variable drive means and turntable and with said control means.

10. An oven for baking pizza as set forth in claim 1 wherein said control means includes computer means programmed for the desired relationship of exposure time and temperature resulting in superior baking of the pizzas.

11. An oven for baking pizza as set forth in claim 10 wherein the time and temperature program provides for the completion of a baking cycle for each pizza in a single revolution of the turntable.

12. An oven for baking pizza as set forth in claim 10 wherein the program provides for baking time between three (3) and six (6) minutes with a baking chamber temperature between 350° and 450° Fahrenheit.

13. An oven for baking pizza set forth in claim 1 and including a manual speed set provision in said control means.

* * * * *